UNITED STATES PATENT OFFICE.

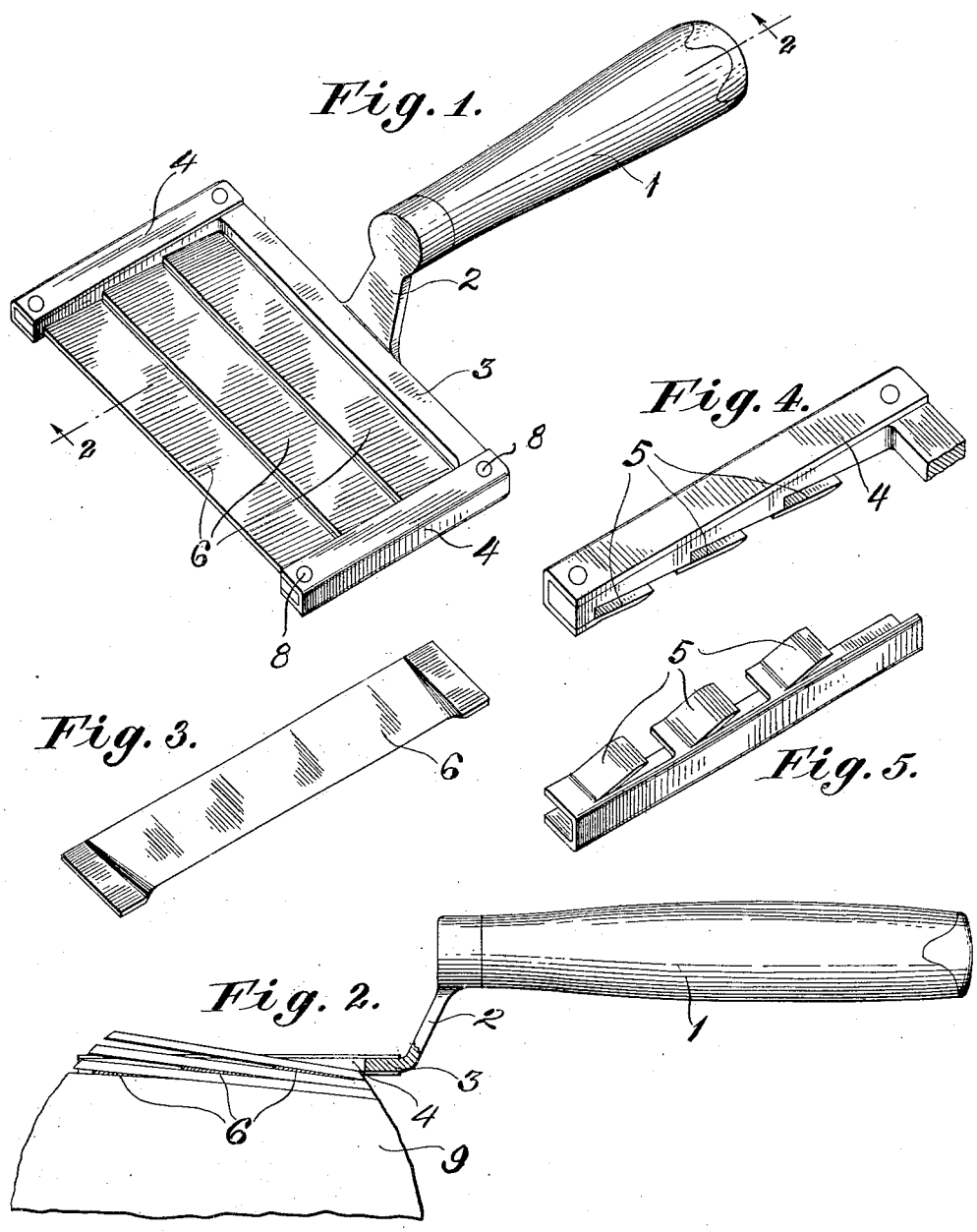

JAN PALINSKI, OF JERSEY CITY, NEW JERSEY.

FOOD-CUTTING DEVICE.

1,348,821. Specification of Letters Patent. Patented Aug. 3, 1920.

Application filed December 8, 1919. Serial No. 343,150.

*To all whom it may concern:*

Be it known that I, JAN PALINSKI, a citizen of Poland, and resident of Jersey City, in the county of Hudson and State of New Jersey, have invented certain new and useful Improvements in Food-Cutting Devices, of which the following is a specification.

This invention relates to food cutting devices, particularly vegetable and fruit cutting devices, such as cabbage-, turnip-, apple-, etc., cutters, and has for its main object the provision of such a device which is simple in construction and operation, and inexpensive in cost of manufacture.

The above and other objects will become apparent in the description below, in which characters of reference refer to like-named parts in the drawings.

Referring briefly to the drawings, Figure 1 is a perspective view of my device.

Fig. 2 is a sectional view taken substantially on the line 2—2 of Fig. 1, and illustrating my device in use.

Fig. 3 is a perspective view of a cutting blade removed from its holder.

Fig. 4 is a fragmentary perspective view of the same, illustrating the means for releasably holding the cutting blades thereof.

Fig. 5 is a fragmentary perspective view of the underside of Fig. 4.

Referring now in detail to the drawings, the numeral 1 represents the handle of my device, and 2 the attaching frame member. A cross-bar or frame 3 is rigid to the member 2, and two side blade-supporting frames 4 are rigid to the member 3 at opposite ends thereof, being secured by means of bolts 8.

Blade holders 5 are bridged across the side members 4, three such being shown in the drawings, said holders being rigidly attached to said members 4 in any convenient manner. These holders form slots between themselves and the undersides of the members 4, into which are inserted blades 6 as shown in Fig. 1; of course said holding members 5 are springy, so that their reaction upon the blades holds said blades securely and releasably. The advantage of this construction lies in that any blade may at will be removed when dull, and immediately replaced by a new blade, the operation consisting in simply pulling a blade forward out of its sockets, and inserting the new blade by simply pushing it into the vacant sockets. Partly for this reason, too, the holding members 5 are inclined downwardly from the side members 4, so that any blade may be removed or replaced without disturbance to the remaining blades or interference with the side frames.

In Fig. 2 I have illustrated the manner of use of my cutter, showing, by way of example, the cutter in operation in cutting slices from an object such as a head of cabbage. It is apparent that my device will, by virtue of the inclination of the blades, as above mentioned, cut any desired number of slices at one stroke, so that thus much time and labor may be spared in the use of the device.

Having thus described my invention, what I claim and desire to secure by Letters Patent is as follows:

1. A device of the class described comprising a substantially U-shaped frame, a plurality of spaced apart, downwardly inclined blades releasably retained between the legs of said U, and means for retaining said blades comprising inclined spring members rigid to said legs.

2. A device of the class described comprising a substantially U-shaped frame, a plurality of spaced apart, downwardly inclined blades releasably retained between the legs of said U, and means for retaining said blades comprising angular recesses in the undersides of said legs and inclined spring members attached to the undersides of said legs and covering said recesses.

Signed at New York in the county of New York and State of New York.

JAN PALINSKI.